United States Patent [19]
Nack et al.

[11] Patent Number: 6,118,939
[45] Date of Patent: Sep. 12, 2000

[54] METHOD AND SYSTEM FOR A REPLACEABLE APPLICATION INTERFACE AT THE USER TASK LEVEL

[75] Inventors: Christopher Joel Nack; Jeffrey John Hawkins; Rhonda Lynn Foshee, all of Raleigh, N.C.

[73] Assignee: International Business Machines Corporation, Armonk, N.Y.

[21] Appl. No.: 09/012,077

[22] Filed: Jan. 22, 1998

[51] Int. Cl.[7] ................................... G06F 9/45
[52] U.S. Cl. .................. 395/701; 345/326; 345/340; 345/334
[58] Field of Search .................. 395/701, 702; 345/356, 326, 340, 334; 707/10; 709/230, 302

[56] References Cited

U.S. PATENT DOCUMENTS

| | | | |
|---|---|---|---|
| 4,692,858 | 9/1987 | Redford et al. | 345/333 |
| 5,179,700 | 1/1993 | Aihara et al. | 345/326 |
| 5,206,950 | 4/1993 | Geary et al. | 395/702 |
| 5,442,746 | 8/1995 | Barrett | 345/357 |
| 5,566,346 | 10/1996 | Andert et al. | 710/8 |
| 5,596,702 | 1/1997 | Stucka et al. | 345/340 |
| 5,724,506 | 3/1998 | Cleron et al. | 709/230 |
| 5,727,175 | 3/1998 | Malone et al. | 345/356 |
| 5,784,619 | 7/1998 | Evans et al. | 709/302 |
| 5,818,446 | 10/1998 | Bertram et al. | 345/334 |
| 5,864,850 | 1/1999 | Nordman | 707/10 |
| 5,907,704 | 5/1999 | Gudmundson et al. | 395/701 |
| 5,907,843 | 5/1999 | Cleron et al. | 707/10 |

OTHER PUBLICATIONS

Tran–Wathen, The HP IVI object–oriented toolkit, Hewlett–Packard Journal, Oct. 1990.

*Primary Examiner*—Eric W. Stamber
*Assistant Examiner*—Antony Nguyen-Ba
*Attorney, Agent, or Firm*—Gerald R. Woods; Felsman, Bradley, Vaden, Gunter & Dillon, LLP

[57] ABSTRACT

A method and system for modifying an existing user interface at the user task level, such that the existing user interface is contained within the data-processing system. Initially, user tasks that enable particular user interface functions are identified within the existing user interface. Each identified user task is then abstracted into a grouping of objects such that the grouping of objects includes a task object which provides a non-interface specific abstraction of the user task, and a view object which provides a user interface abstraction of the task object. Thereafter the user interface of an identified user task is modified by altering only the view object of the plurality of objects maintained within the user task, such that an alteration of the view object allows a user to effect specific changes to selected portions of the existing user interface without globally altering the existing user interface. The grouping of objects further includes a window object associated with the view object, such that a modification of the window object also does not globally effect specific changes to selecting portions of the existing user interface.

10 Claims, 11 Drawing Sheets

METHOD AND SYSTEM FOR A REPLACEABLE APPLICATION INTERFACE AT THE USER TASK LEVEL

BACKGROUND OF THE INVENTION

1. Technical Field

The present invention relates in general to application interfaces which convey information to users via data-processing systems. The present invention also relates to graphical user interface applications which display within such data-processing systems, user-interactive objects associated with particular functions and tasks. More particularly, the present invention relates to methods and systems that allow application developers to readily and efficiently modify application interface functions and tasks. Still more particularly, the present invention relates to a method and system for providing a replaceable application interface at the user task level.

2. Description of the Related Art

In the computer arts, an application interface is a type of algorithm or program that enables a program to operate with a user, another program such as an operating system, or with computer hardware. Such application or user interfaces can be command-line driven, menu-driven, or based on a graphical user interface. A graphical user interface is a type of display format which enables a user to choose commands, start programs, and see lists of files, objects and other options by pointing to pictorial representations and lists of menu items on a computer display screen. Choices can generally be activated by either a keyboard or a pointing device such as a mouse. A mouse is a commonly utilized pointing device, containing one or more buttons, that allows a user to interact with a product or operating environment through an associated graphical user interface.

Some conventional graphical user interfaces provide a cursor and scroll bar for scrolling through portions of a viewable object. A viewable object is an object that is the focus of a user's attention. A viewable object can contain multiple components such as spreadsheets, text, hotlinks, pictures sound, and video objects. However, a viewable object is not limited to these components. In many types of graphical user interfaces, a vertical or horizontal bar at the side or bottom of a graphical user interface window can be utilized in conjunction with a pointing device such as a mouse, trackball, or stylus to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

A typical graphical user interface usually includes some sort of a menu arrangement. A menu in a graphical user interface is typically composed of a list of options from which a user can select in order to perform a desired action, such as choosing a command or applying a particular format to part of a document. A graphical user interface thus utilizes menus to provide users with an easily learned, easy-to-use alternative to memorizing program commands and their appropriate usage. Without such a menu, a user is forced to memorize such program commands and their appropriate usage, or resort to textbooks or other literature or still other computer programs associated with the particular graphical user interface or program. Choosing from one menu can often lead a user to a second menu or to a dialog box or dialog containing options that further refine the original menu section.

In the computer industry, it is often desirable to modify user interfaces such as graphical user interfaces to adapt to varying technology. For example, there is a continuing need to "touch enable" subsets of user tasks in existing interface applications. This requires modifying or completely replacing user interfaces of those tasks. Since touch screens utilize larger controls, the "touch versions" of each task generally require more screens than the corresponding graphical user interface version. The user task itself will not be altered in most cases. However, the interfaces must be changed to support the unique requirements for touch.

Problems are often encountered during the development and marketing of graphical user interface applications in which feedback may be utilized to modify functions associated with the graphical user interface. Customer feedback typically results in queries such as "can you alter the way in which thus function behaves," or "the interface for this function would be better if . . . " and "can you add this widget to this function?" Many of these requests thus revolve around alterations to existing functions. Such alterations almost always result in alterations to the user interface (e.g., modifying the graphical user interface to a touch screen technology). In the touch screen example described above, the difficulties in modifying the graphical user interface require that only a subset of the user functions be enabled, although there is not always a one-to-one correspondence between existing screens and touch enabled screens.

From the foregoing, it can be appreciated that a need exists for a technology that would allow interface developers to easily and efficiently modify a subset of user interface functions and tasks without modifying the entire user interface. Such a need is addressed by the disclosure presented and described herein.

SUMMARY OF THE INVENTION

It is therefore one object of the present invention to provide improved application interfaces which convey information to users via data-processing systems.

It is therefore another object of the present invention to provide improved graphical user interface applications which display within data-processing systems, user-interactive objects associated with particular functions and tasks.

It is yet another object of the present invention to provide an improved method and system that allows application developers to readily and efficiently modify application interface functions and tasks.

It is still another object of the present invention to provide an improved method and system for providing a replaceable application interface at the user task level.

The above and other objects are achieved as is now described. A method and system are provided for modifying an existing user interface at the user task level, such that the existing user interface is contained within the data-processing system. Initially, user tasks that enable particular user interface functions are identified within the existing user interface. Each identified user task is then abstracted into a grouping of objects such that the grouping of objects includes a task object which provides a non-interface specific abstraction of the user task, and a view object which provides a user interface abstraction of the task object. Thereafter the user interface of an identified user task is modified by altering only the view object of the plurality of objects maintained within the user task, such that an alteration of the view object allows a user to effect specific changes to selected portions of the existing user interface without globally altering the existing user interface. The grouping of objects further includes a window object associated with the view object, such that a modification of the window object also does not globally effect the existing user interface.

Thus each user task is abstracted into a set of objects. Each task object includes a view. Each view includes one or more window objects. The interface between the task and view is consistent, regardless of the implementation of the interface. The view abstraction is replaceable, such that the interface of any particular task can be replaced or modified by replacing the view object. Since each view contains the window objects for the task, a replacement view is provided with a different number of windows than an original view. Because the interface between the task and the new view is the same, the new view can be used in place of the old view. Utilizing this abstraction, if a developer desires to replace or alter the interface for a specific task, he or she merely adds, alters or replaces window objects and updates the view as necessary. The task object does not have to be changed. Thus, the existing user interface may be replaced or altered separately for each task. The windows are the actual implementation of the task. The number of windows, along with the window details, are hidden from the task object.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
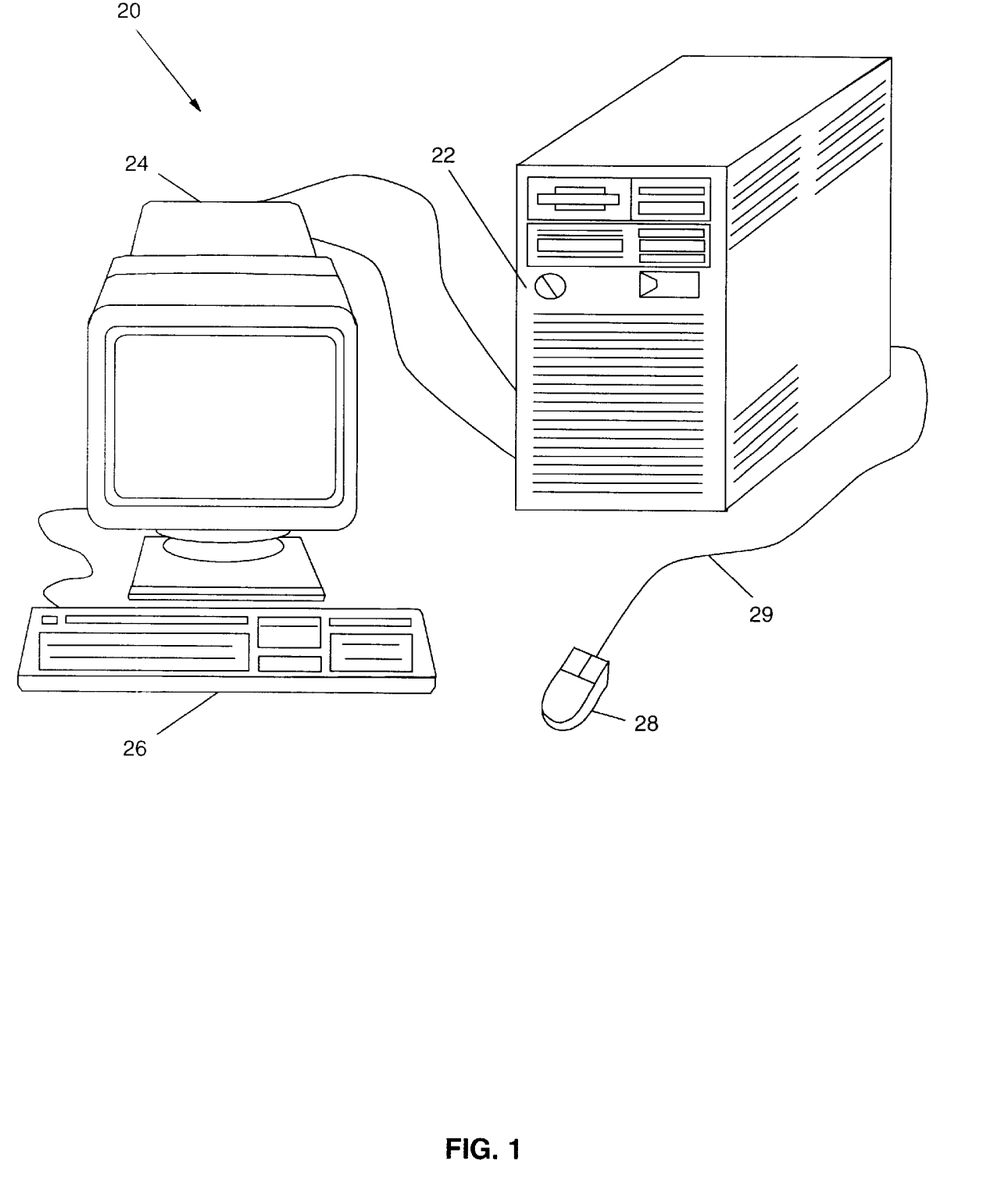
FIG. 1 illustrates a pictorial representation of a computer system in accordance with a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment involves a personal computer, a preferred embodiment of the present invention can be implemented in other types of data-processing systems, such as, for example, intelligent workstations or mini-computers. Computer system 20 includes a graphical user interface that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen.

Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons.

Figure 2:
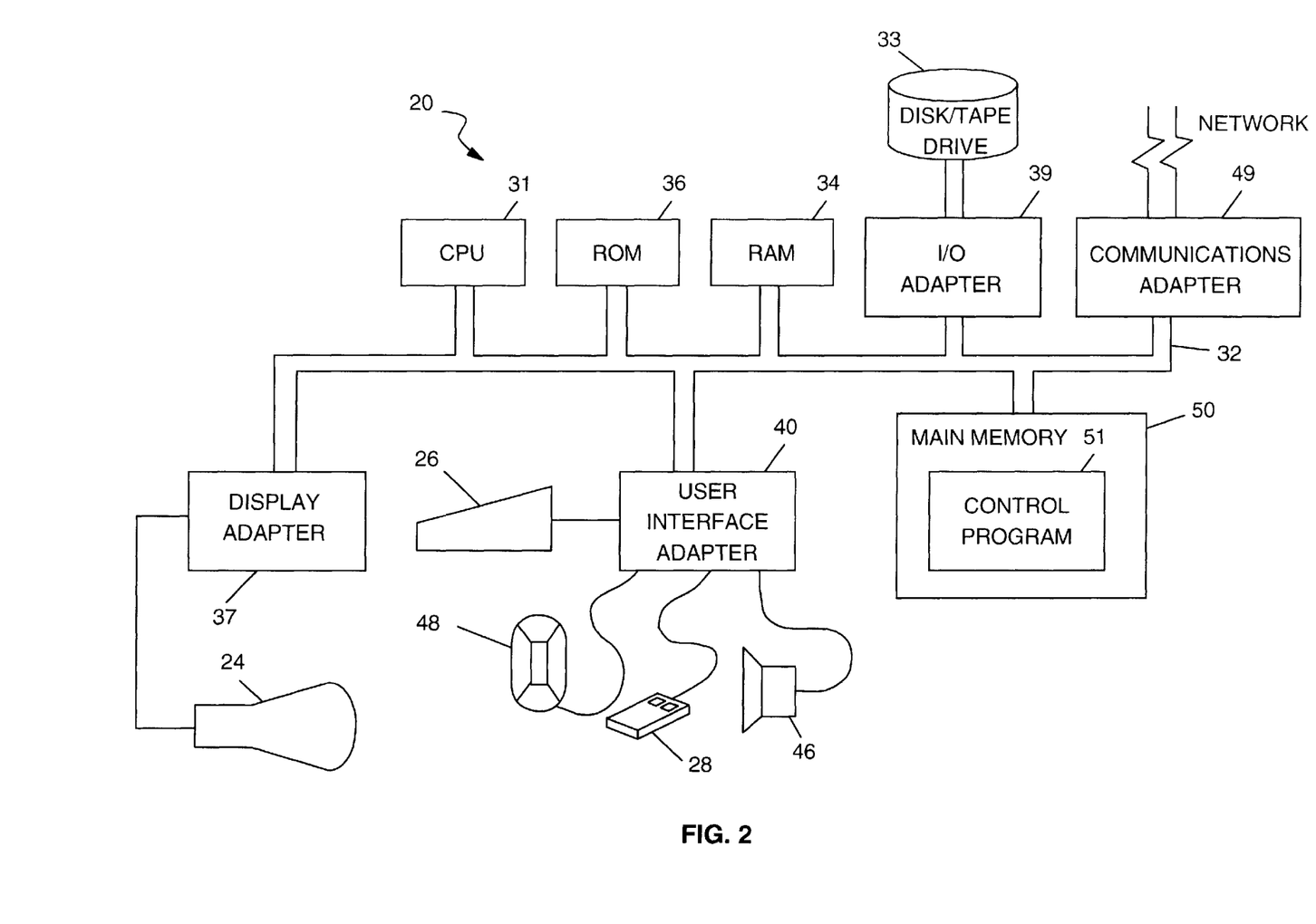
FIG. 2 depicts a representative hardware environment of a computer system in accordance with a the preferred embodiment of the present invention.

FIG. 2 depicts a representative hardware environment of a computer system in accordance with a preferred embodiment of the present invention. System unit 22 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electro-mechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or micro-floppy (e.g., 3.5 inch) disk is encased in a protective plastic jacket. A hard disk, which is very finely machined, is typically enclosed in a rigid case and can be exposed only in a dust free environment.

Video display 24 is the visual output of computer system 20. Video display 24 can be, for example, a CRT-based video display well-known in the art of computer hardware. "CRT" is an acronym for cathode-ray tube. With a portable or notebook-based computer, video display 24 can be replaced with an LCD-based or a gas plasma-based flat-panel display. "LCD" is an acronym for liquid crystal display. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that possess multiple CPUs and to computer systems that include multiple buses that each perform different functions in different ways.

Computer system 20 also includes a graphical user interface that resides within a machine-readable media to direct the operation of computer system 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
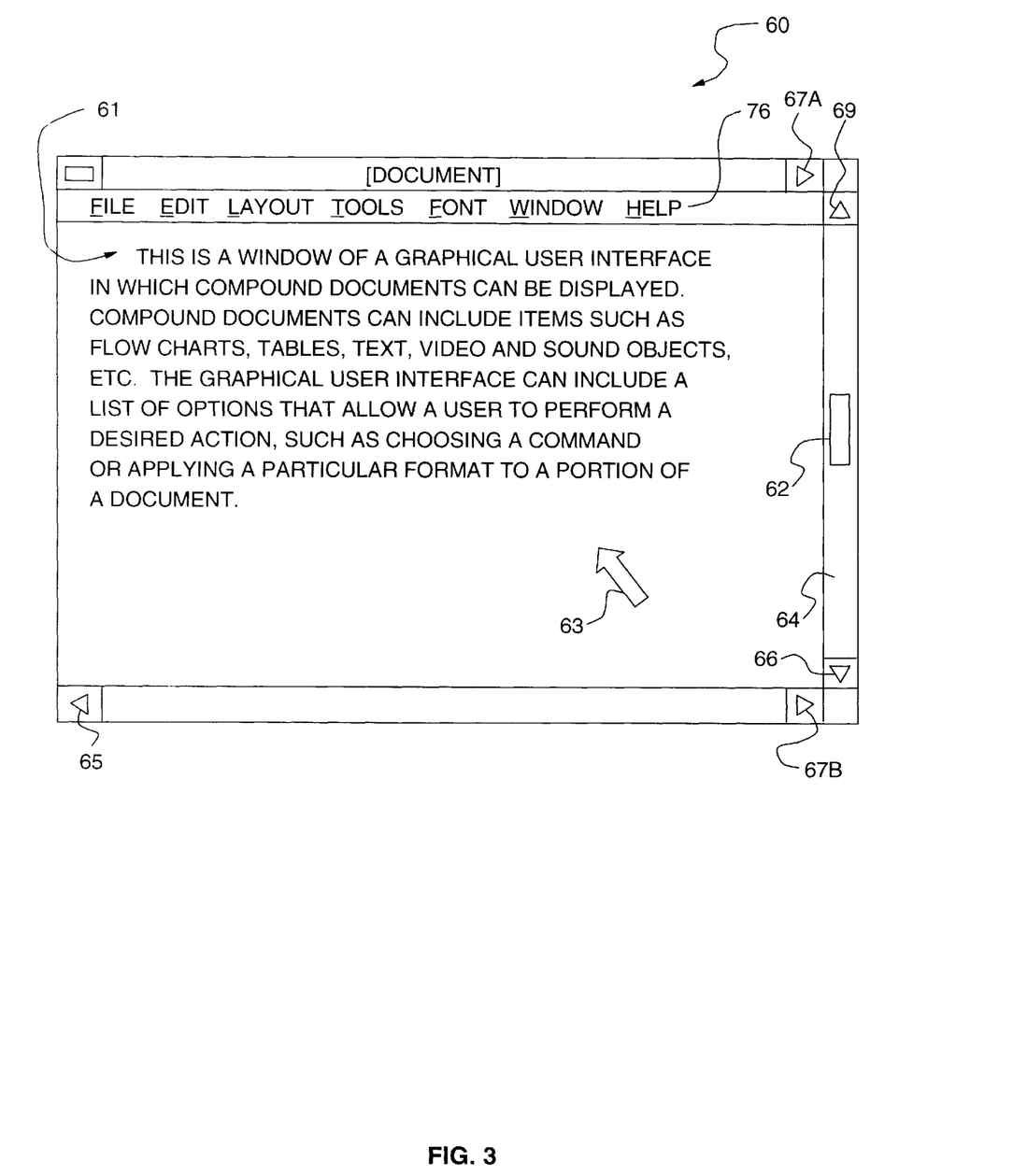
FIG. 3 illustrates a pictorial representation of a graphical user interface window in accordance with a preferred embodiment of the present invention.

FIG. 3 illustrates a pictorial representation of a graphical user interface window 60 in accordance with the method and system of the present invention. FIG. 3 presents a graphical user interface configuration in which a window 60 displays a portion of a viewable object, such as a compound document 61. Window 60 is an area on the display screen of a visual display device such as video display 24 of FIG. 1 that is utilized to present a view of an object or to conduct a dialog with a user. Such "windows" can be utilized to present objects, action options, messages, and so forth. Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can be too large or contain too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as computer document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a mouse cursor 63 over up-arrow 69 or down-arrow 66 of scroll bar 64 and "click" a button on a pointing device such as a mouse to scroll the document upward or downward, as appropriate. Scrolling in this manner permits viewing of any desired portion of compound document 61. Scrolling is essentially the electronic equivalent of reading through a rolled (i.e., "scrolled") document rather than flipping through pages of a book. Arrows 65, 67a and 67b can also be utilized by a graphical user interface user to scroll left or right through compound document 61. Scroll bar 64 is thus a graphical user interface window component, associated with a scrollable area, that indicates to a user that more information is available in a particular direction and can be scrolled into view.

In FIG. 3, the graphical user interface window 60 sizes slider 62 within scroll bar 64 according to the number of pages in compound document 61. The length of slider 62 is small with respect to the length of scroll bar 64 because it represents one of many pages of compound document 61. Similarly, the graphical user interface positions slider 62 within scroll bar 64 relative to the viewable position of compound document 61. For example, the graphical user interface positions slider 62 at the top of scroll bar 64 when the user is viewing the first page of compound document 61, and at the bottom of scroll bar 64 when the user is viewing the last page of compound document 61. Slider 62 on scroll bar 64 is defined to have a minimum size.

In a preferred embodiment of the present invention, an interface is abstracted into user tasks, and each user task is abstracted into a set of objects. Each task object includes a view. Each view includes one or more window objects. The interface between the task and view is consistent regardless of the implementation of the interface. The view abstraction is also replaceable, such that the interface of any particular task can be replaced or modified by replacing the view object. Since the view contains the window objects for the task, a replacement view is provided with a different number of windows than the original view. Because the interface between the task and the new view remains the same, the new view can be utilized in place of the old view.

Examples of user tasks include, "regular sale," "productivity report," "tender count," and so on. According to a preferred embodiment of the present invention, provision is made for a method and system for replacing the interface for a particular task. The user interface is divided into three parts—the task, the view, and the windows. The task provides a non-interface specific abstraction of the user task. Whenever application events occur that must necessarily be reflected in the interface, the task is notified. The task also provides communications between the user interface (i.e., whether graphic or otherwise) and functional logic, such as, for example, business logic. Each task object creates and maintains its own "view" instance. The task utilizes the view as its connection to the user interface.

The view provides a user interface abstraction for the task. The view hides details related to the number of windows that are required to implement the task. The view also hides from the task, details regarding controls associated and displayed with each window. The view thus provides a replaceable layer which may be replaced on a per-task basis in order to replace or alter the interface for the task. Thus, the interface may be replaced or altered separately for each task. The windows are the actual implementation of the task. As described herein, the number windows, and the window details are hidden from the task object. Thus, according to the method and system described above, if a developer desires to replace or alter the interface for a specific task, he or she would add, change, or replace window objects as desired, and update the view as necessary. It would not be necessary to alter the task object.

Figure 4:
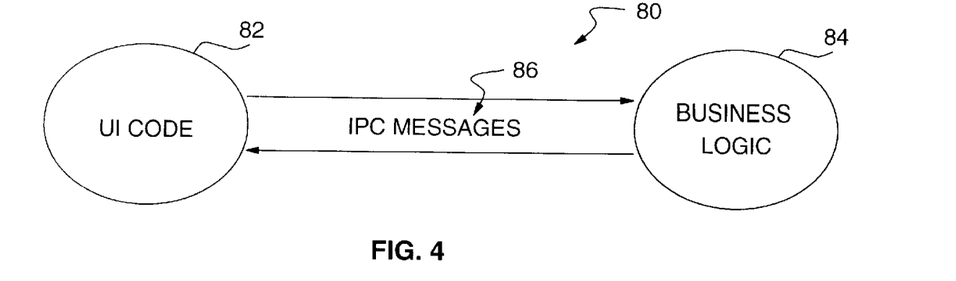
FIG. 4 depicts a block diagram of a prior art GUI model in which business logic is separated from an application interface via a message passing metaphor.

FIG. 4 depicts a block diagram 80 of a prior art graphical user interface model in which business logic 84 is separated from an application user interface 82 via a message passing metaphor 86. Application user interface 82 includes user interface code. Information is passed between business logic 84 and application user interface 82 through message passing metaphor 86 in the from of interprocess communication (IPC) messages. Thus, prior art graphical user interface models separate business logic from the interface via this message passing metaphor. The graphical user interface configuration depicted in FIG. 3 is an example of a graphical user interface which may be based upon a prior art graphical user interface model, but which may be modified according to a preferred embodiment of the present invention. In prior art models, an implementation for handling business logic messages in the user interface exists in client dialog classes. The intent of such a configuration was to allow the user interface to be entirely replaced at the message level. Because the touch interface replaces the interface for certain tasks (e.g., sales and till), the touch interface must coexist with existing graphical user interfaces for any remaining tasks. Thus, those skilled in the computer arts will appreciate that the requirement for a touch user interface to coexist with a base graphical user interface requires an entirely new abstraction which can be implemented efficiently at the task level. The new touch interface and any new base graphical user interface tasks can be implemented utilizing the abstraction described herein.

Figure 5:
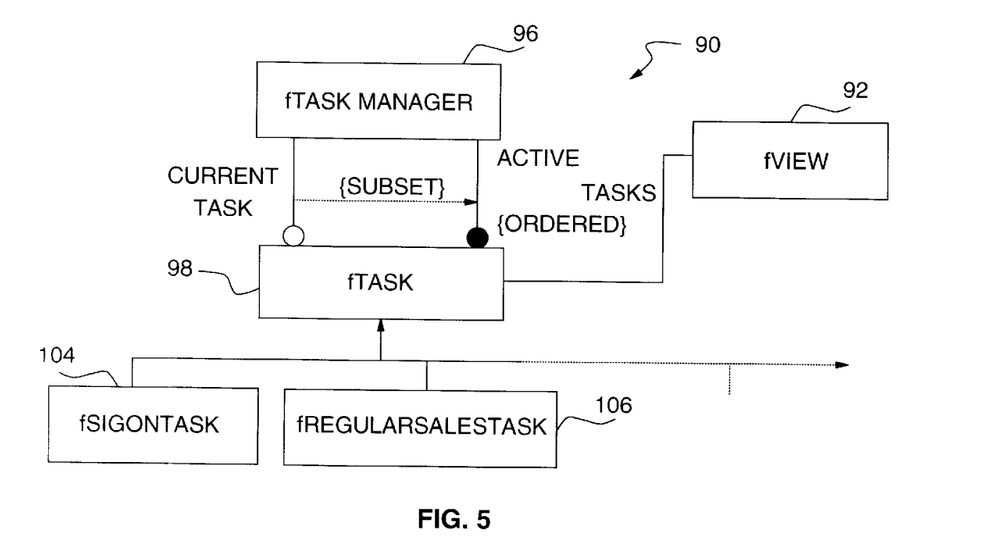
FIG. 5 illustrates a block diagram illustrative of a task model in accordance with a preferred embodiment of the present invention.

FIG. 5 illustrates a block diagram illustrative of a task model 90 in accordance with a preferred embodiment of the present invention. Task model 90 includes a task manager 96, view class 92, task object 98, a sign on task subclass 104, and a regular sales task subclass 106. Task model 90 signifies that a task manager object (i.e., task manager 96) contains a collection of active tasks. Tasks represent user activities and generally correspond with current menu choices. One of the tasks, according to a preferred embodiment of the present invention, is designated as a "current" task if it is currently being displayed. Client code begins and ends tasks via task manager 96. So-called "active" tasks are "ordered" via user interaction (i.e, user input). The most recently accessed tasks are ordered before the least recently used tasks, which allows the task manager to automatically bring up the user's "last" task when the current task ends. Task manager 96 automatically starts a default task when a sales task is completed following a successful sign-on operation. Task manager 96 sends appropriate messages to the business logic in order to handle authorization validation prior to handling any new task.

Each task subclass (by virtue of inheriting characteristics from task class 98, labeled "fTask") contains a pointer to its view class 92. The view is the implementation independent abstraction of the task's interface. Note that the task subclass instantiates the appropriate view subclass (refer to description related to the view model in FIG. 6). The task encapsulates IPC messaging between the user interface and business logic. In general, each task contains an object window, a user handler and an IPC message receiver. The task may basically "be" the business logic for the user task. In essence, the task functions as the view's (i.e., view class 92) interface to the business logic. The task communicates with the business logic via IPC. The task, however, is not necessarily a messaging conduit.

Figure 6:
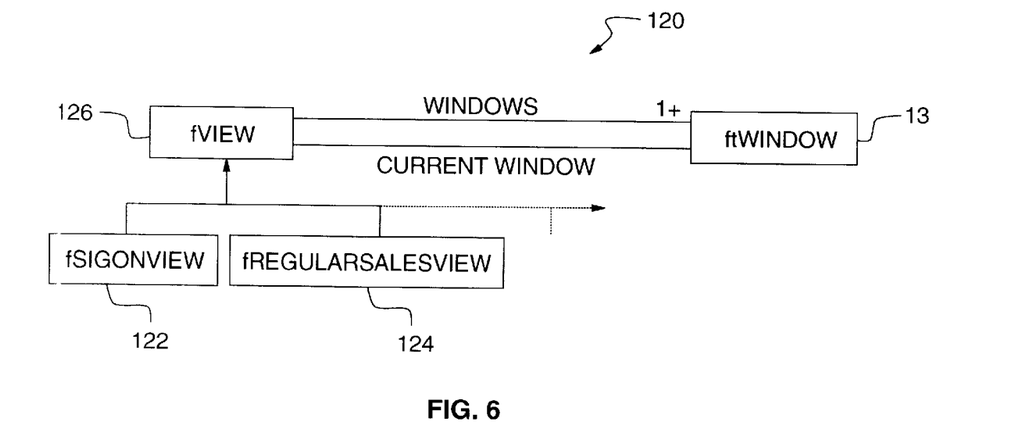
FIG. 6 depicts a block diagram illustrative of a view model in accordance with a preferred embodiment of the present invention.

FIG. 6 depicts a block diagram illustrative of a view model 120 in accordance with a preferred embodiment of the present invention. The purpose of the view is to provide a non-implementation specific abstraction of the interface for the task. The task communicates with the view through a non-graphical user interface specific interface. The view acts as a bridge between the task and the actual windows which implement the interface for the task. This shields the task from having any knowledge about how the graphical user interface for the task is implemented. Individual windows can be added, removed, or altered without any modifications to the task required. Even if the entire graphical user interface for the task is altered, it is not necessary that the task also be altered because the view provides an abstraction of the interface. Each task contains a view as shown in FIG. 5. The view abstracts the interface for the task, and contains one or more windows necessary to implement the task.

The block diagram depicted in FIG. 6 is an object model demonstrating that each view contains one or more windows. One of these windows possesses the attribute "current window," meaning that this is the window currently displayed when the view is active. The items depicted at 122 and 124 (i.e., sign-on view 122 and regular sales view 124) within this object model are specific subclasses of the general view base class 126. Sign-on view 122 and regular sales view 124 correspond to the subclasses of "fTask" (i.e., task class 98) of FIG. 5. Each task has one and only one view.

Thus, view model 120 includes view class 126 which receives data from window 128. Each view class 126 contains a pointer to one or more windows which comprise the user interface for the view's task. By virtue of object oriented inheritance, each specific subclass of the view, such as sign-on view 122 and regular sales view 124 also contain pointers to the windows comprising the user interfaces for the respective tasks. Regular sales view 124 is a user task in a sales application. Those skilled in the art will appreciate that such a sales application is merely an example of an application that may be utilized in accordance with a preferred embodiment of the present invention. Regular sales view 124 is a task that a clerk can utilize to sell items to customers. Because regular sales view 124 is a task, regular sales view 124 also has a view which is responsible for displaying the user interface during the regular sales task.

Note that view class 126 of FIG. 6 is analogous to view class 92 of FIG. 5. In addition to the other functions described herein, view class 126 is also responsible for managing the flow between the task windows (i.e., if there is more than one window), as well as any interaction between windows. The view creates and contains a collection of all window objects necessary for the task.

Figure 7:
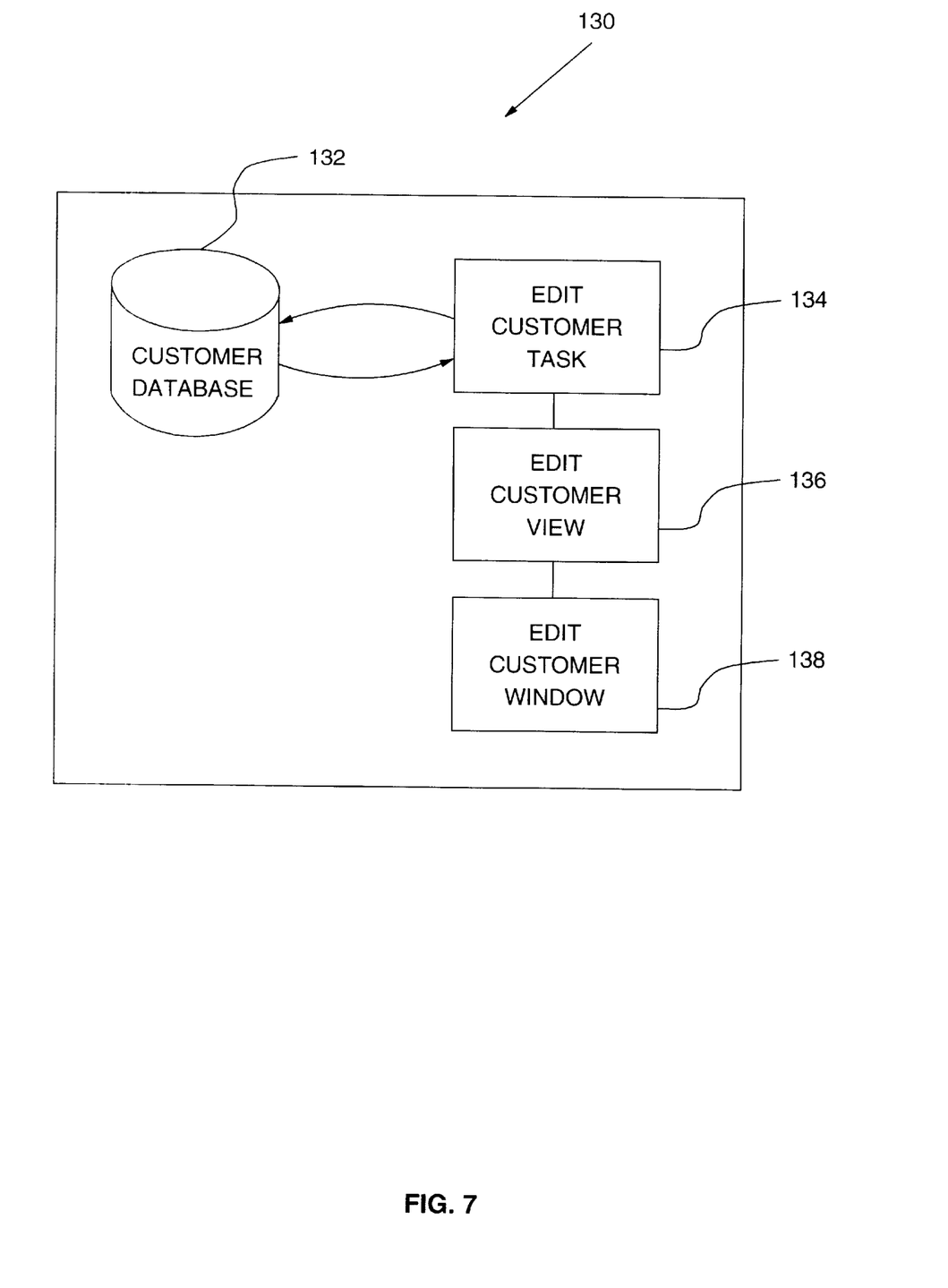
FIG. 7 illustrates a block diagram illustrative of an object model in accordance with a preferred embodiment of the present invention.

FIG. 7 illustrates a block diagram illustrative of an object model 130 in accordance with a preferred embodiment of the present invention. Object model 130 includes an Editor Customer Window 138 with a pointer to Edit Customer View 136. Edit Customer View 136 contains a pointer to Edit Customer Task 134 which in turn accesses Customer Database 132. Edit Customer Task 134 encapsulates changing personal and business address information of a specific customer. A Customer Search Task would have been performed prior to executing Edit Customer Task 134 in order to allow the user to specify the specific customer record to update. Edit Customer Task 134 also encapsulates the business logic for this task. In this case, the task provides read and write access to customer database storage (i.e, Customer Database 132). When the Edit Customer Task 134 is created and initialized, it creates its corresponding Edit Customer View and reads the customer database to retrieve the requested record.

Figure 9:
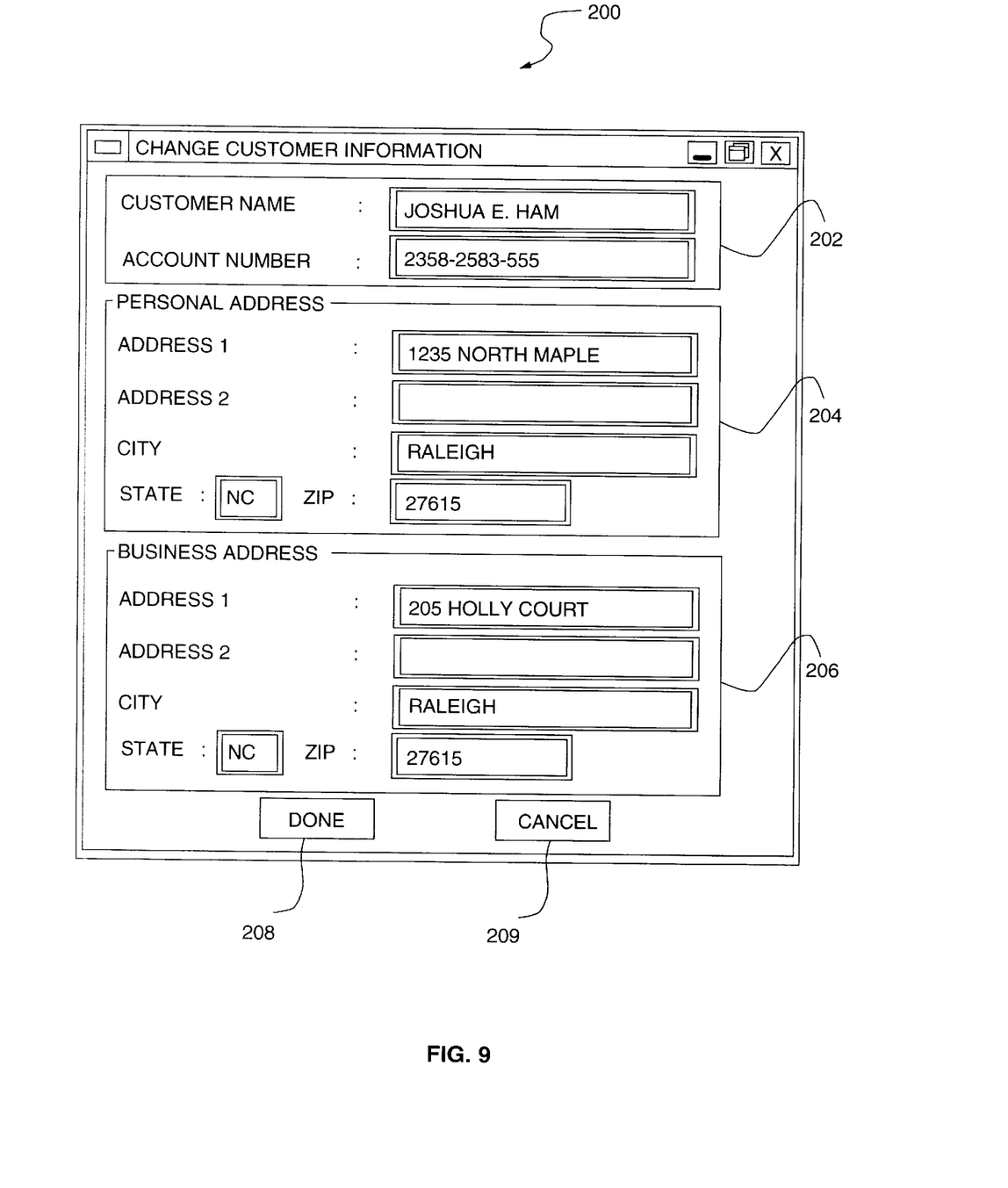
FIG. 9 illustrates a sample window for entering customer information, in accordance with a preferred embodiment of the present invention.

Additionally, when the Edit Customer View is created, it creates the window or windows necessary to implement the user interface for Edit Customer Task 134. Edit Customer View 136 initializes the window or windows with appropriate customer information. In the object model depicted in FIG. 7, a single window referred to as the "Edit Customer Window" is created (i.e., Edit Customer Window 138). An actual implementation of this window is depicted in FIG. 9 herein. The user makes desired changes to this window and presses a "done" button to make these changes permanent in the customer database (e.g., Customer Database 132). Edit Customer Window 138 then passes an event to Edit Customer View 136 to indicate that the user has pressed the "Done" button on the window. The view handles this event and interprets this event as an indication that the user desires to save the updates. The view then retrieves the updated data from the window, and calls a method in the task to cause the task (i.e., Edit Customer Task 134) to save the new customer information.

Figure 8:
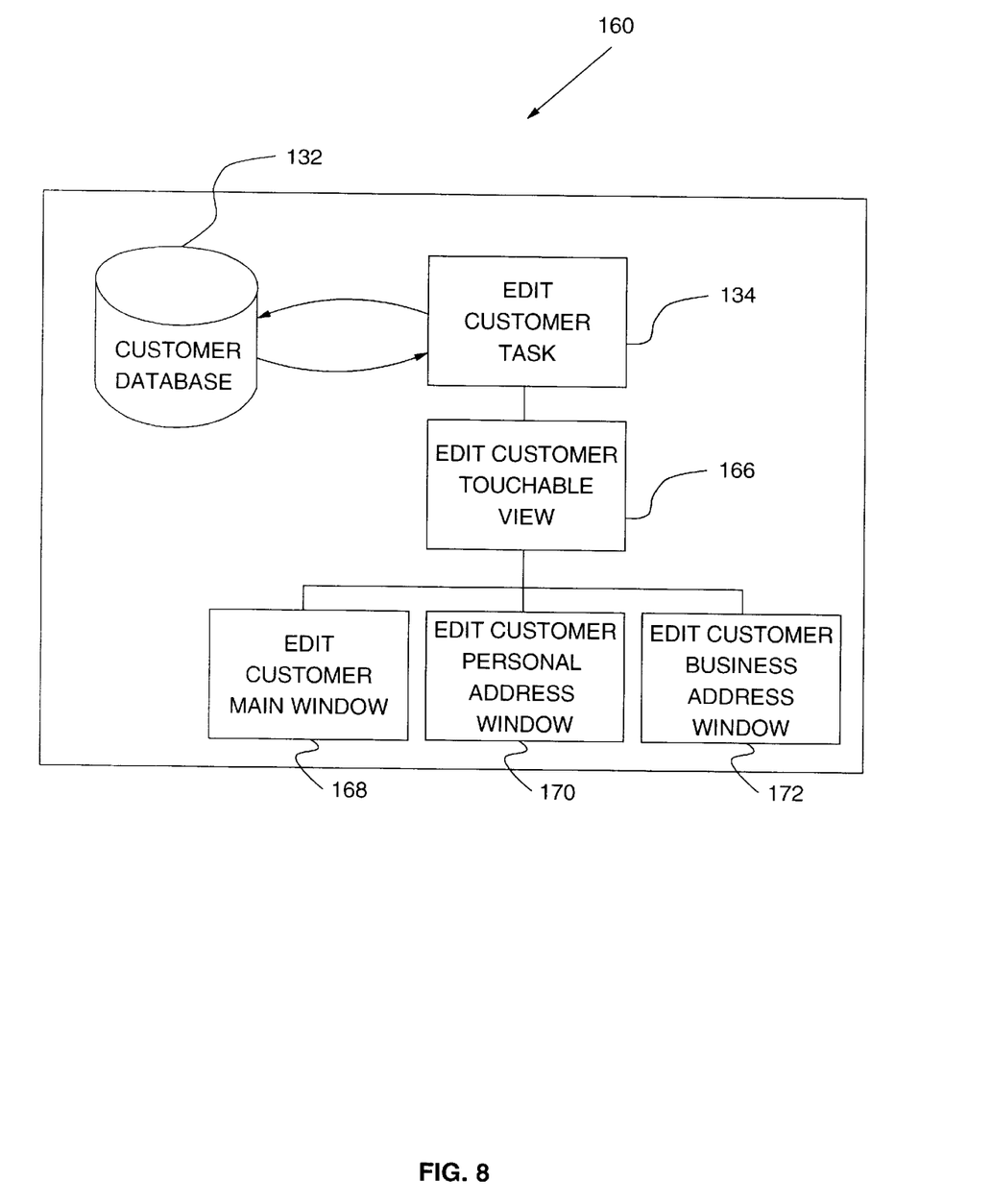
FIG. 8 depicts a block diagram of an object model wherein a user interface is touch enabled, in accordance with a preferred embodiment of the present invention.

FIG. 8 depicts a block diagram of an object model 160 wherein a user interface is touch enabled, in accordance with a preferred embodiment of the present invention. Note that in FIG. 7 and FIG. 8, like parts are indicated by like reference numerals. Thus, Edit Customer Task 134 and Customer Database 132 remain unmodified from the example depicted in FIG. 7. Business logic and customer database access functions are left unaltered from the model illustrated in FIG. 7. Edit Customer Main Window 168, Edit Customer Personal Address Window 170, and Edit Customer Business Address Window 172 contain pointers to Edit Customer Touchable View 166, which in turn has a pointer to Edit Customer Task 134. Thus, three windows are provided which perform the Edit Customer user interface in a particular touch enabled environment.

The interface and interaction between the Edit Customer Task and the new Edit Customer Touchable View 166 in FIG. 8 are identical to the interface and interaction between Edit Customer Task 134 and the original Edit Customer View 136 depicted in FIG. 7. When Edit Customer Touchable View 166 is created and initialized, it creates three windows. The Edit Customer Main Window 168 is shown in greater detail in FIG. 9. The Edit Customer Personal Address Window 170 is illustrated in greater detail in FIG. 10, while the Edit Customer Business Address Window 172 is depicted in greater detail in FIG. 11. After creating these three windows, Edit Customer Touchable View 166 causes Edit Customer Main Window 168 to be displayed. When a "Change Personal Address" graphical button is pressed, an event is sent to the view. The view processes this event, which causes Edit Customer Business Address Window 172 to be displayed.

Figure 11:
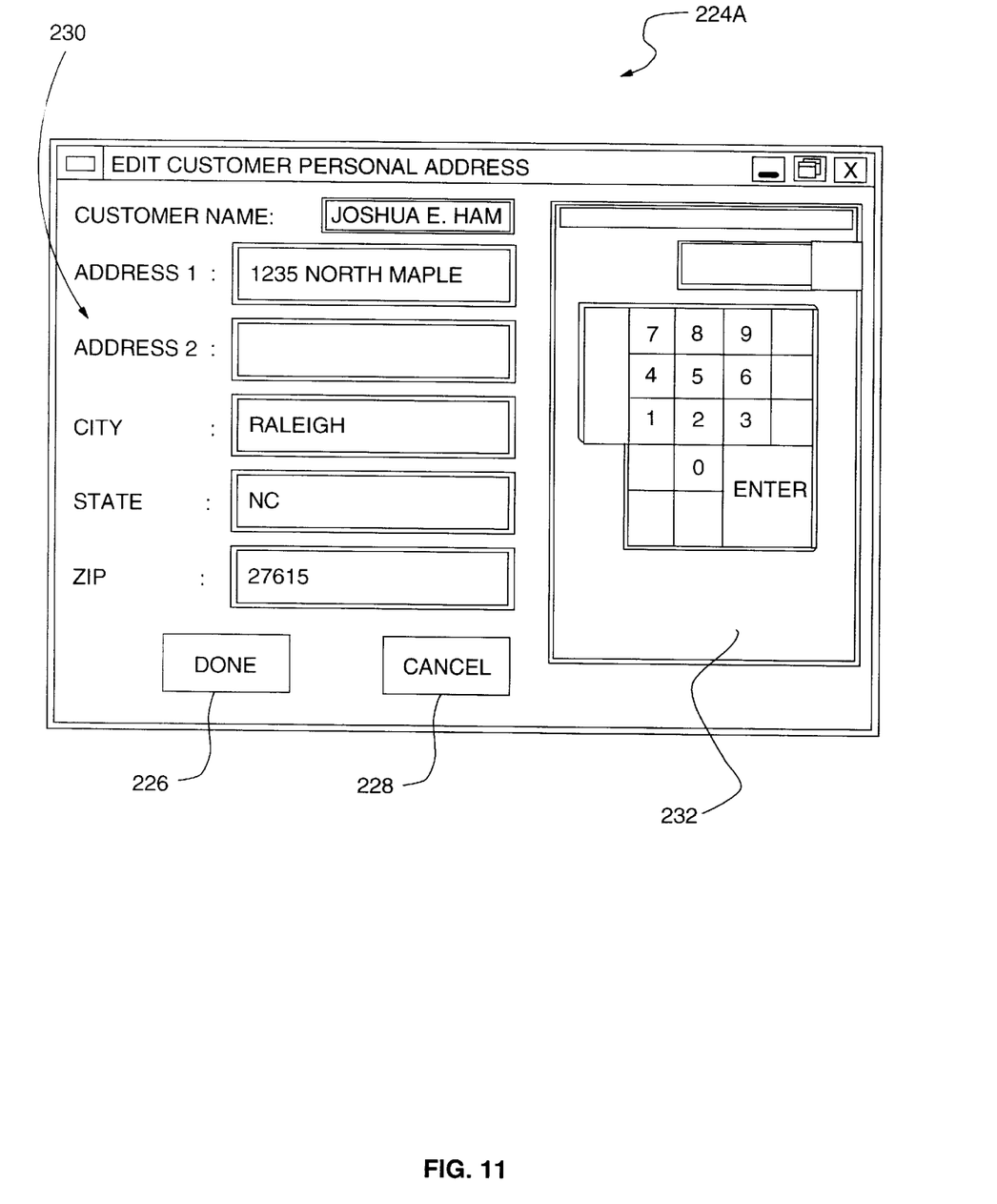
FIG. 11 illustrates an edit customer personal address window in accordance with a preferred embodiment of the present invention.

The user makes the desired updates to the customer's personal address information, and presses the "Done" graphical button on the Edit Customer Personal Address Window (this "Done" graphical button is shown more specifically in FIG. 11). The window sends an event to the view, informing it that the "Done" button has been pressed. The view processes this event and interprets this event as indicating that the user has finished updating the personal address information. The view then causes the Edit Customer Main Window to be redisplayed. When the user presses the "Done" button on the Edit Customer Main Window, the window sends an event to the view (i.e., Edit Customer Touchable View 166) to notify the view that the "Done" button was successfully pressed. The view handles this event and interprets it as an indication that the user desires to save the updates. The view then retrieves the updated data from the windows, and calls a method in the task to cause the task to save the new customer information.

Figure 10:
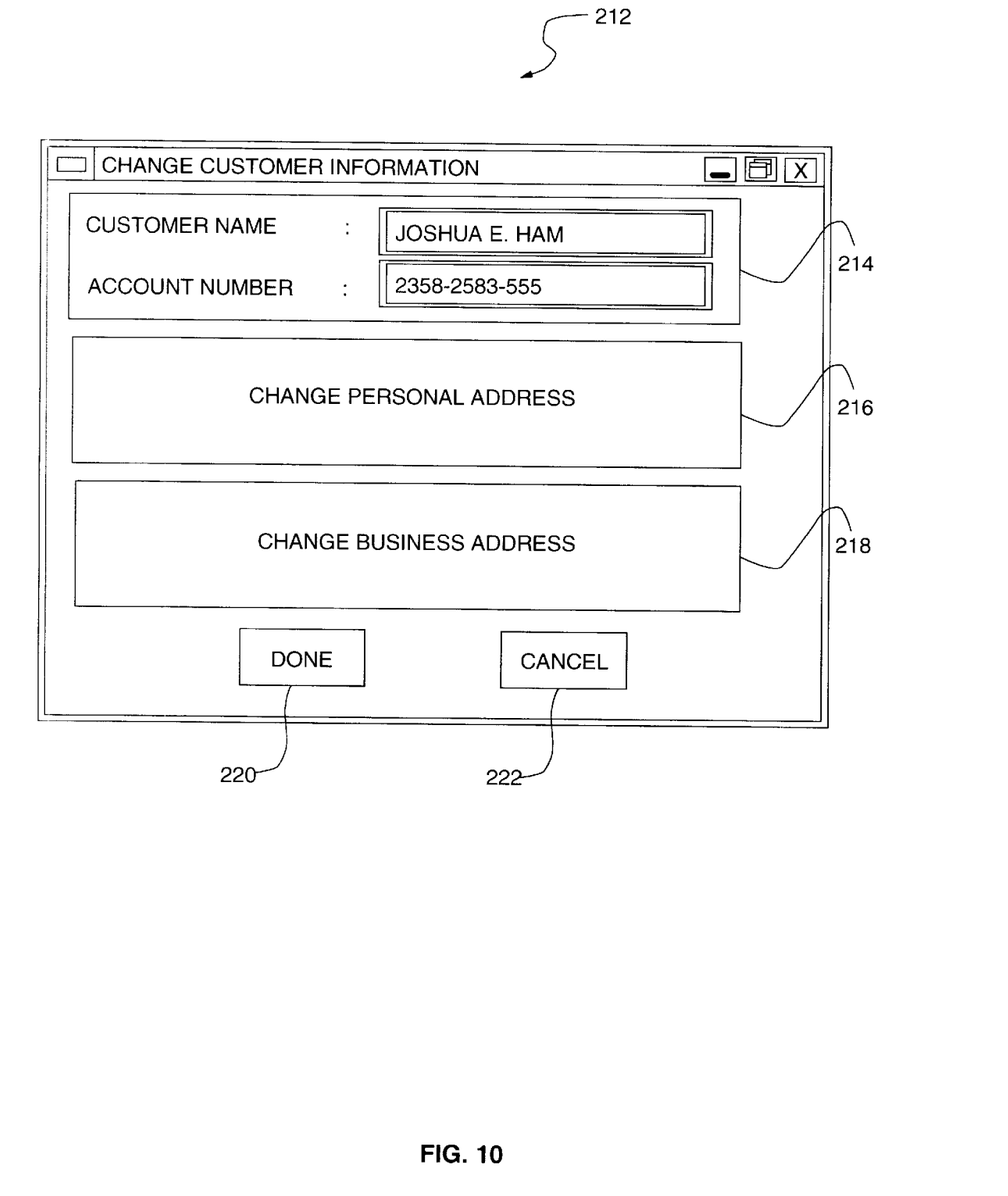
FIG. 10 depicts an edit customer main window in accordance with a preferred embodiment of the present invention.

Based on the object models depicted in FIG. 7 and FIG. 8 and the accompanying graphical user interface windows illustrated in FIG. 9 to FIG. 11, those skilled in the art can appreciate that all method calls and data passing between the task and the two views are identical, even when the number of windows has changed. However, the method calls and event handling between the two views and the associated windows may be interpreted and acted upon differently. For example, the view interprets the significance of the "Done" button for various windows differently as described herein.

FIG. 9 illustrates a sample Edit Customer Window 200 for entering customer information, in accordance with a preferred embodiment of the present invention. Edit Customer Window 200 is an implementation of Edit Customer Window 138 of FIG. 7. Edit Customer Window 200 includes a section 202 for entering general customer information such as "customer name" and "account number." Section 204 includes personal address information, while section 206 includes business address information which may be entered by a user. A graphical button 209 allows a user to "cancel" any information entered within these various sections, while graphical button 208 allows a user to indicate to the underlying graphical user interface and application program that the information has been successfully entered. The user thus makes the desired changes to Edit Customer Window 200 and presses the "Done" button. The Edit Customer Window then passes an event to the Edit Customer View to indicate that the user has pressed the "Done" button on the window. The view handles this event and interprets this event as an indication that the user desires to save these updates. The view then retrieves the updated data from the window, and calls a method in the task to cause the task to save the new customer information.

FIG. 10 depicts an Edit Customer Main Window 212 in accordance with a preferred embodiment of the present invention. Edit Customer Main Window is an example of an implementation of Edit Customer Main Window 168 of FIG. 8. Edit Customer Main Window includes a section 214 in which customer information such as "customer name" and "account number" may be altered. A graphical button 216 allows a user to change the personal address, while graphical button 218 allows a user to change the business address. A "Done" button 220 and a "Cancel" button 222 are also displayed within Edit Customer Main Window 212.

Figure 12:
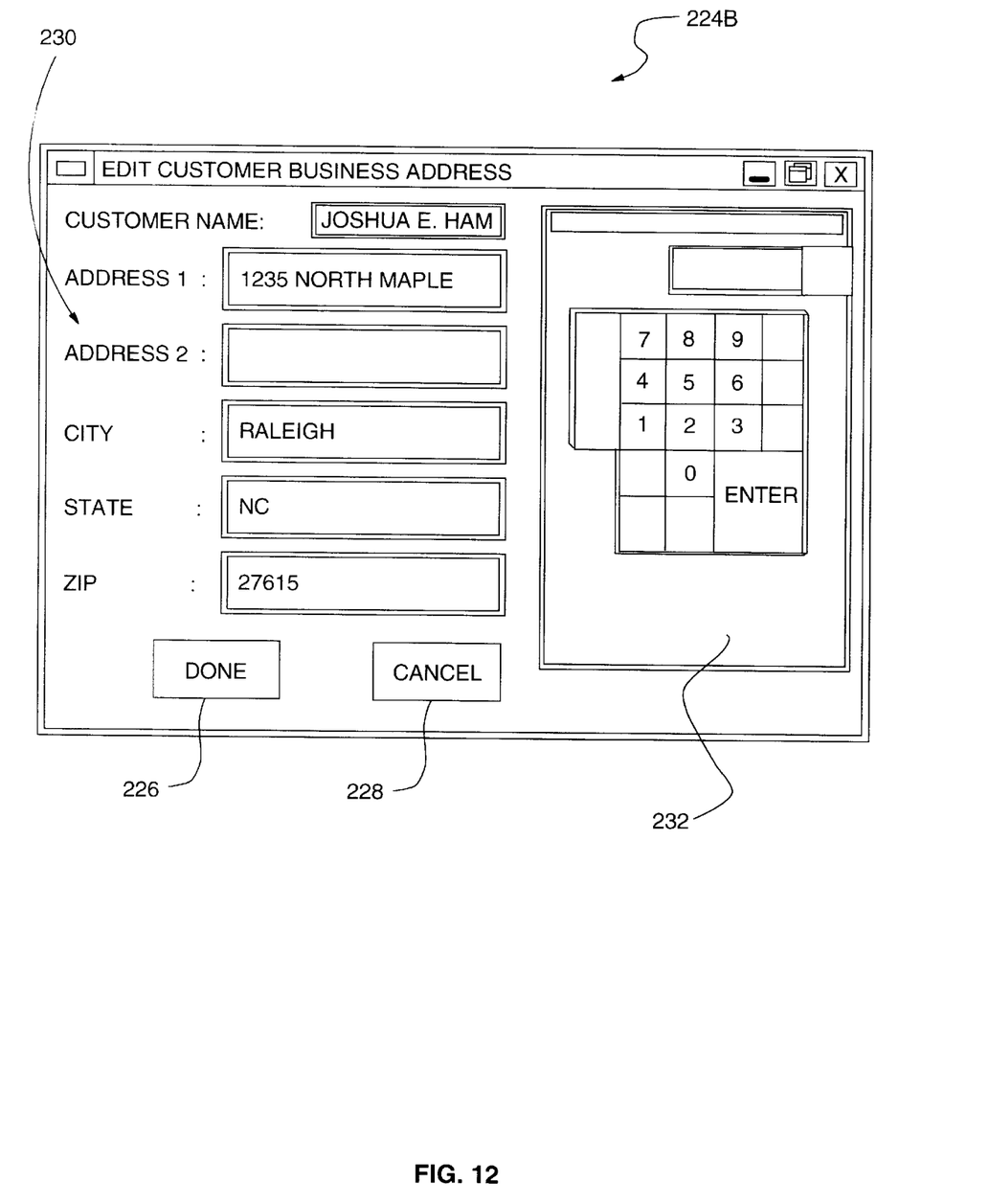
FIG. 12 depicts the edit customer business address window of FIG. 11 with altered address text, in accordance with a preferred embodiment of the present invention.

FIG. 11 illustrates an Edit Customer Personal Address Window 224a in accordance with a preferred embodiment of the present invention. Edit Customer Personal Address Window 224a is an example of an implementation of Edit Customer Personal Address Window 170 depicted in FIG. 8 and described herein. Edit Customer Personal Address Window 224a includes a section 230 for entering address information. Included within Edit Customer Personal Address Window 224a is a graphical "Done" button 226 and a "Cancel" button 228. A graphical pad 232 is provided with additional graphical buttons for assisting the user in altering address information. In FIG. 11 and FIG. 12, like parts are indicated by like reference numerals. FIG. 12 depicts an Edit Customer Business Address Window 224b in accordance with a preferred embodiment of the present invention. FIG. 12 depicts the edit customer business address window of FIG. 11 with altered address text. Edit Customer Business Address Window 224b demonstrates a view in which the address has been altered. By pressing the "Done" graphical button with a pointing device such as a mouse, the changes to the address are subsequently implemented according to the method and system described herein.

Figure 13:
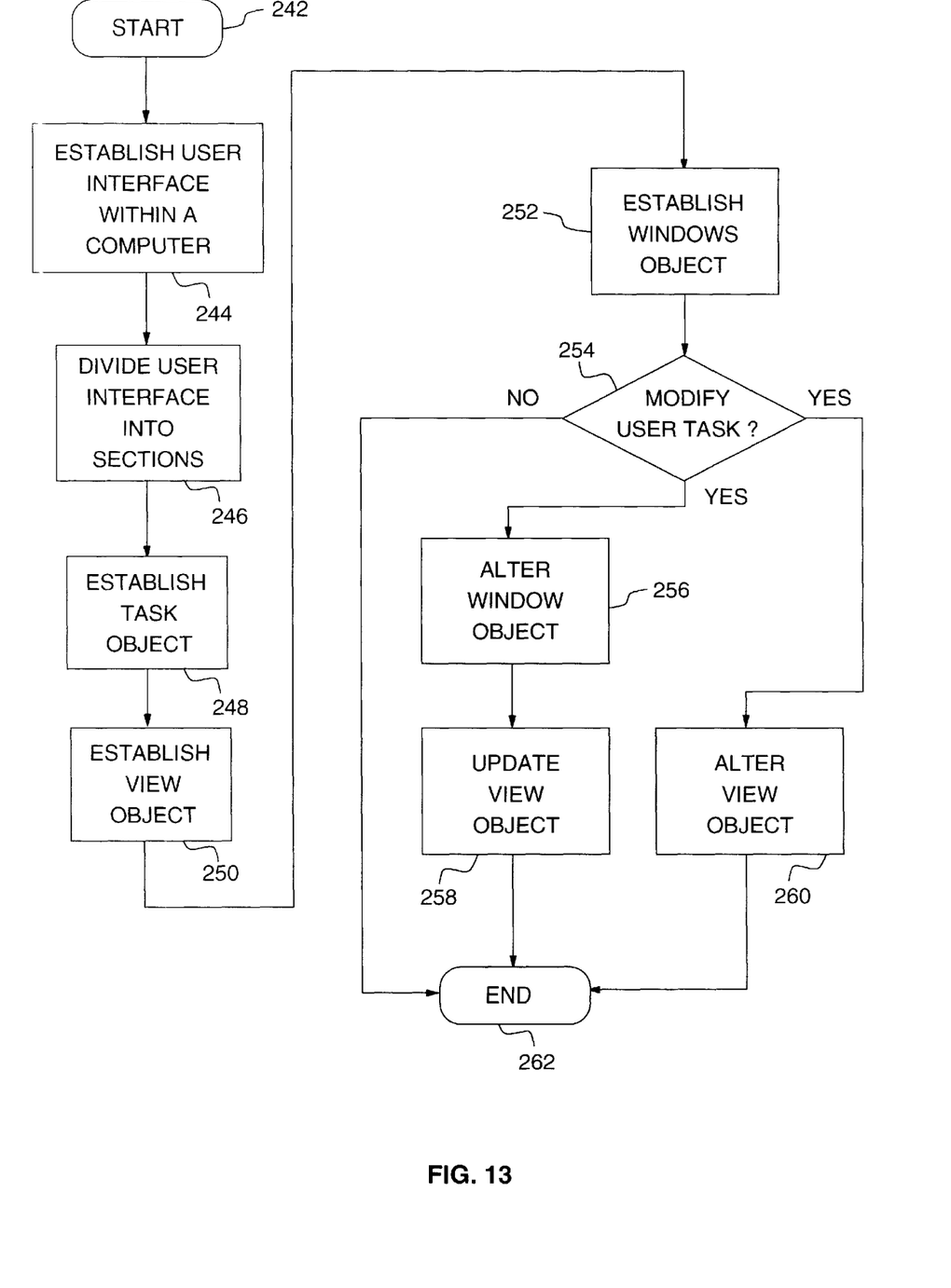
FIG. 13 is a high-level flow diagram that shows steps utilized to carry out the method and system of the present invention, according to a preferred embodiment of the present invention.

FIG. 13 is a high-level flow diagram 240 that shows steps utilized to carry out the method and system of the present invention, according to a preferred embodiment of the present invention. It can be appreciated by those skilled in the art that FIG. 13 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer 20 depicted in FIG. 1 and FIG. 2, in processing electrical or other (e.g. mechanical, chemical) physical signals to generate other desired physical signals.

Thus, the process is initiated, as depicted at block 242. Thereafter, as illustrated at block 244, a user interface is established within a computer. The user interface is divided, as described at block 246, into three sections—a task object, a view object and a windows object. As illustrated at block 248, the task object is established. The task object provides a non-interface specific abstraction of the user task. When application events occur that must be reflected in the interface, the task object is notified. The task object also provides communications between the user interface and business logic. Each task object creates and maintains its own "view" instance. The task object utilizes the view as its connection to the interface. As indicated at block 250, the view object is established. The view object includes one or more window objects, which are established, as illustrated at block 252. The interface between the task object and the view object is consistent.

As described at block 254, a test is performed to determine whether or not a user desires to modify the user task. If the user does not desire to modify the user task, then the process simply ends (i.e., a "NO" response) as illustrated at block 262. However, if the user does desire to modify the user task, two options are then available to the user to modify the user task. The view object can be altered, as described at block 260, or the window object can altered as described at block 256. Following alteration of the window object, the view object is updated, as described at block 258. The view abstraction is thus replaceable, such that the interface of any particular task can be replaced or modified by replacing the view object. Since the view contains the window objects for the task, a replacement view can be provided with a different number of windows than the original view. Those skilled in the art will appreciate that other logic flow charts may also be utilized in accordance with a preferred embodiment of the present invention.

The embodiments and examples set forth herein are presented in order to best explain the present invention and its practical application and to thereby enable those skilled in the art to make and use the invention. However, those skilled in the art will recognize that the foregoing description and examples have been presented for the purposes of illustration and example only, and may be utilized to customize a variety of other graphical user interface elements, objects and functions, not merely the graphical user interface items set forth and described herein. From the foregoing, those skilled in the art can appreciate that the description as set forth is not intended to be exhaustive or to limit the invention to the precise form disclosed. Many modifications and variations are possible in light of the above teaching without departing from the spirit and scope of the following claims.

What is claimed is:

1. A method for modifying a user-interface layer of an application executable by a data processing system having a display device and an input device without modifying the underlying functionality of the application, said method comprising:

creating a task subclass for performing first and second functions in response to user input, said task subclass having one view interface;

creating a view subclass having:
a first user-interface layer for displaying first and second objects in a first window and for receiving user input from said first window; and
a task interface for passing said user input from said first window to said task subclass via said view interface, such that said user input from said first window causes said task object to perform said first and second functions; and thereafter, modifying said view subclass by replacing said first user-interface layer with a second user-interface layer for displaying second and third windows, said second window containing said first object and not said second object and said third window containing said second object and not said first object, such that said application is modified to perform said first function in response to user input received from said second window and to perform said second function in response to user input received from said third window without said task subclass being modified.

2. A method according to claim 1, wherein:
said method further comprises receiving said view class and receiving a task class having a pointer to said view class;
said view subclass is derived from said view class;
said task subclass is derived from said task class; and
said view interface includes said pointer to said view class, said pointer having been inherited from said task class.

3. A method according to claim 2, wherein said step of modifying said view subclass is performed automatically in response to user input.

4. A method according to claim 3, further comprising:
displaying said second window in said display device; and
displaying said third window in said display device.

5. A data processing system with an application having a user interface layer that can be modified without modifying the underlying functionality of the application, said data processing system comprising:

processing resources and a memory;
a task subclass that is stored in said memory and that is capable of performing first and second functions in response to user input, said task subclass having one view interface; and
a view subclass that is stored in said memory, said view subclass having:
a first user interface layer that displays first and second objects in a first window and that receives user input from said first window; and
a task interface that passes said user input from said first window to said task subclass via said view interface, such that said user input from said first window causes said task object to perform said first and second functions; and
means for modifying said view subclass by replacing said first user interface layer with a second user interface layer for displaying second and third windows, said second window containing said first object and not said second object and said third window containing said second object and not said first object, such that said application is modified to perform said first function in response to user input received from said second window and to perform said second function in response to user input received from said third window without said task subclass being modified.

6. A data processing system according to claim 5, wherein:
said data processing system further comprises a view class and a task class having a pointer to said view class;
said view subclass is derived from said view class;
said task subclass is derived from said task class; and
said view interface includes said pointer to said view class, said pointer having been inherited from said task class.

7. A data processing system according to claim 6, wherein said means for modifying automatically modifies said view subclass in response to user input.

8. A program product for modifying a user interface layer of an application without modifying the underlying functionality of the application, said program product comprising:

a task subclass capable of performing first and second functions in response to user input, said task subclass having one view interface;

a view subclass having:

a first user interface layer that displays first and second objects in a first window and that receives user input from said first window; and a task interface that passes said user input from said first window to said task subclass via said view interface, such that said user input from said first window causes said task object to perform said first and second functions; and means for modifying said view subclass by replacing said first user interface layer with a second user interface layer for displaying second and third windows, said second window containing said first object and not said second object and said third window containing said second object and not said first object, such that said application is modified to perform said first function in response to user input received from said second window and to perform said second function in response to user input received from said third window without said task subclass being modified; and a computer usable medium encoding said task subclass, said view subclass, and said means for modifying said view subclass.

9. A program product according to claim 8, wherein:

said program product further comprises a view class encoded in said computer usable medium, a task class encoded in said computer usable medium, said task class having a pointer to said view class;

said view subclass is derived from said view class;

said task subclass is derived from said task class; and said view interface includes said pointer to said view class, said pointer having been inherited from said task class.

10. A program product according to claim 9 further comprising means, encoded in said computer usable medium, for automatically modifying said view subclass in response to user input.

* * * * *